US008599717B2

United States Patent
Gao et al.

(10) Patent No.: US 8,599,717 B2
(45) Date of Patent: Dec. 3, 2013

(54) METHOD FOR STOPPING A TRACING FLOW

(75) Inventors: Yin Gao, Shenzhen (CN); Lin Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 388 days.

(21) Appl. No.: 12/841,374

(22) Filed: Jul. 22, 2010

(65) Prior Publication Data

US 2011/0002238 A1 Jan. 6, 2011

Related U.S. Application Data

(63) Continuation of application No. PCT/CN2009/070300, filed on Jan. 23, 2009.

(30) Foreign Application Priority Data

Jan. 30, 2008 (CN) .......................... 2008 1 0000264

(51) Int. Cl.
*G01R 31/08* (2006.01)
*H04Q 11/04* (2006.01)

(52) U.S. Cl.
CPC ................ *H04Q 11/0478* (2013.01)
USPC .......................................... 370/253; 455/436

(58) Field of Classification Search
CPC .......................... H04Q 11/0478; H04W 36/30
USPC .................... 370/253, 331; 455/436
See application file for complete search history.

(56) References Cited

U.S. PATENT DOCUMENTS

| 7,826,823 | B1* | 11/2010 | Einamo ........................ 455/410 |
| 8,254,907 | B2* | 8/2012 | Yao ................................ 455/423 |
| 2007/0099561 | A1* | 5/2007 | Voss ........................... 455/12.1 |
| 2007/0226701 | A1* | 9/2007 | Suonvieri et al. ............ 717/128 |
| 2008/0098467 | A1* | 4/2008 | Miller et al. ....................... 726/5 |
| 2011/0002238 | A1* | 1/2011 | Gao et al. ...................... 370/253 |

FOREIGN PATENT DOCUMENTS

| CN | 1494349 | A | 5/2004 | |
| CN | 1531254 | A | 9/2004 | |
| CN | 1627703 | * | 6/2005 | ............. H04L 12/24 |
| CN | 1627703 | A | 6/2005 | |
| EP | 2239966 | * | 10/2010 | ............. H04W 4/00 |
| WO | WO99/65261 | * | 12/1999 | ............. H04Q 7/34 |
| WO | 0011902 | A1 | 3/2000 | |

OTHER PUBLICATIONS

English Translation of CN1627703, Cui Jing, 2005, Espacenet, pp. 1-8.*

(Continued)

*Primary Examiner* — Phuongchau B Nguyen
(74) *Attorney, Agent, or Firm* — Bright IP Law Offices

(57) ABSTRACT

The present invention discloses a method for stopping a tracing flow, wherein, a mobility management entity sends a tracing de-activating message to an evolved node B, wherein, the tracing de-activating message carries tracing reference information; responding to the tracing de-activating message, the evolved node B stops related tracing flow according to the tracing reference information. And the tracing de-activating message carries stopping description information. The related tracing flow may be stopped by the tracing de-activating message by means of the present invention so as to achieve flexibility of tracing function and improve network performance.

16 Claims, 2 Drawing Sheets

(56) References Cited

OTHER PUBLICATIONS

PCT/CN2009/07300, International Preliminary Report, Jan. 30, 2008, pp. 1-5.*

3rd Generation Partnership Project; Technical Specification and System Aspects; Telecommunication Management; Subscriber and Equipment Trace; Trace Control and Configuration Management (Release 6)—3GPP TS 32.422 V6.5.0 (Dec. 2005).*

3rd Generation Partnership Project; Technical Specification and System Aspects; Telecommunication Management; Subscriber and Equipment Trace; Trace Control and Configuration Management (Release 7)—3GPP TS 32.421 V7.0.0 (Sep. 2005).*

P.R. China, State Intellectual Property Office, International Search Report for International Application No. PCT/CN2009/070300, mailed Apr. 30, 2009.

* cited by examiner

METHOD FOR STOPPING A TRACING FLOW

This is a continuation of International Application PCT/CN2009/070300, with an International Filing date of Jan. 23, 2009, which claims priority to Chinese Application No. 200810000264.1, filed Jan. 30, 2008, each of which is incorporated by reference.

TECHNICAL FIELD OF THE INVENTION

The present invention relates to mobile communication field, more specifically, relates to a method for stopping a tracing flow in the long term evolution (LTE) network.

BACKGROUND OF THE INVENTION

The long term evolution (LTE) network consists of evolved UMTS terrestrial radio access network (E-UTRAN), base station, evolved node B (eNB) and evolved packet core (EPC), and its network structure is flat.

In the above LTE network, the E-UTRAN comprises a set of eNBs connected with the EPC via S1 interface, wherein the eNBs may be connected with each other via X2, and S1 and X2 are logical interfaces. One EPC may manage one or more eNBs, one Node B may also be controlled by a plurality of EPCs, and one eNB may be in charge of one or more cells.

At present, to reduce the load of signaling message caused by the use of tracing, tracing commands are bound to the existing flows. On the S1 interface, it is supported that an SAE BEARER SETUP REQUEST message (wherein SAE is the acronym of system architecture evolution) and an INITIAL CONTEXT SETUP REQUEST message include the tracing command flows of users or devices. Meanwhile, on X2 interface, it is supported that tracing command flow information of users or devices may be included in HANDOVER REQEUST message. However, considering that the need of performing signaling tracing to a UE currently in activated state can be satisfied by a single signaling tracing initiation message, and at the same time, the methods for signaling tracing using bearers and initial context messages mentioned above may also be avoided, the single signaling tracing initiation command is employed to initiate signaling tracing at present.

To achieve flexibility of the tracing function, users or devices need to be able to initiate a tracing flow and to stop the tracing flow as well. However, there is so far no existing technology for stopping the tracing flow.

SUMMARY OF THE INVENTION

Considering the lack of technology for stopping a tracing flow in relevant technologies, the present invention provides a method for stopping a tracing flow so as to remedy the deficiency in the relevant field as mentioned above.

According to one aspect of the present invention, there is provided a method for stopping a tracing flow.

The method for stopping a tracing flow according to the present invention comprises that a mobility management entity sending a tracing de-activating message to an evolved node B, wherein, the tracing de-activating message carries tracing reference information; responding to the tracing de-activating message, the evolved node B stopping related tracing flow according to the tracing reference information, wherein the tracing de-activating message carries stopping description information.

The stopping description information comprises UE locating information, which is a unique symbol identifying a connection between the evolved node B and the UE on an S1 interface and/or a unique symbol identifying a connection between the mobility management entity and the UE on an S1 interface. The stopping description information is set with a time stamp and/or a waiting time, and the evolved node B performs a tracing de-activating operation according to the indications of the time stamp and/or the waiting time after receiving the de-activating message. The stopping description information is set with a stopping manner, which comprises immediate stopping manner or later stopping manner. The unique connection symbol associated with the UE on the S1 interface, the time stamp, the waiting time, the immediate stopping manner and the later stopping manner mentioned above may be used separately or in combination with each other.

Wherein, the mobility management entity sends the tracing de-activating message via an S1 interface.

Wherein, the tracing reference information serves to indicate the tracing flow to be stopped, and the tracing reference information is unique within a predetermined range.

According to another aspect of the present invention, there is also provided another method for stopping a tracing flow.

The method for stopping a tracing flow according to the present invention comprises a first evolved node B sending a tracing de-activating message to a second evolved node B, wherein the tracing de-activating message carries tracing reference information; responding to the tracing de-activating message, the second evolved node B stopping related tracing flow according to the tracing reference information, wherein, the tracking de-activating message carries stopping description information for indicating a stopping time and/or a stopping manner of the tracing flow.

Wherein, the first evolved node B sends the tracing de-activating message via an X2 interface.

Wherein, the tracing reference information serves to indicate the tracing flow to be stopped, and it is unique within a predetermined range.

The stopping description information comprises UE locating information, which is a unique symbol identifying a connection between the evolved node B and the UE on an S1 interface and/or a unique symbol identifying a connection between the mobility management entity and the UE on an S1 interface. The stopping description information is set with a time stamp and/or a waiting time, and the evolved node B performs a tracing de-activating operation according to the indications of the time stamp and/or the waiting time after receiving the de-activating message. The stopping description information is set with a stopping manner, which comprises an immediate stopping manner or a later stopping manner. The unique connection symbol associated with the UE on the S1 interface, the time stamp, the waiting time, the immediate stopping manner and the later stopping manner mentioned above may be used separately or in combination with each other.

Additionally, the tracing de-activating message may be sent during a hand-over procedure, wherein the first evolved node B is the source evolved node B, and the second evolved node B is the target evolved node B, or the first evolved node B is the target evolved node B and the second evolved node B is the source evolved node B.

The related tracing flow may be stopped by the tracing de-activating message according to at least one of the above technical solutions provided by the present invention so as to achieve flexibility of the tracing function and improve network performance.

Other characteristics and advantages of the present invention will be described in the following specification, and will be apparent partly from the specification and embodiments of the present invention. The objects and other advantages can be realized and obtained through the structure of the specification, claims, and the drawings.

BRIEF DESCRIPTION OF THE DRAWINGS

The figures described here provide a further understanding to the present invention and constitute a part of the present application, which serve to explain the present invention with the embodiments and are not intended to restrict the present invention. In the figures.

DETAILED DESCRIPTION OF THE EMBODIMENTS

As mentioned above, users and devices shall be able to not only initiate a tracing flow but also stop the tracking flow to achieve flexibility of the tracing flow. However, there is no any existing solution for stopping the tracing flow so far. In view of this, the embodiments of the present invention provide a method for stopping the tracing flow to remedy the deficiency in the relevant technologies.

The preferred embodiments of the present invention will be described in combination with the accompanying drawings in detail as follows. It shall be understood that the preferred embodiments described here only serve to explain the present invention and are not intended to restrict it, and if not conflict, the embodiments and the technical features of the embodiments can be combined.

The First Embodiment

According to one embodiment of the present invention, there is provided a method for stopping a tracing flow, used for the Core Network (CN) to notify the LTE of stopping the indicated tracing flow.

Figure 1:
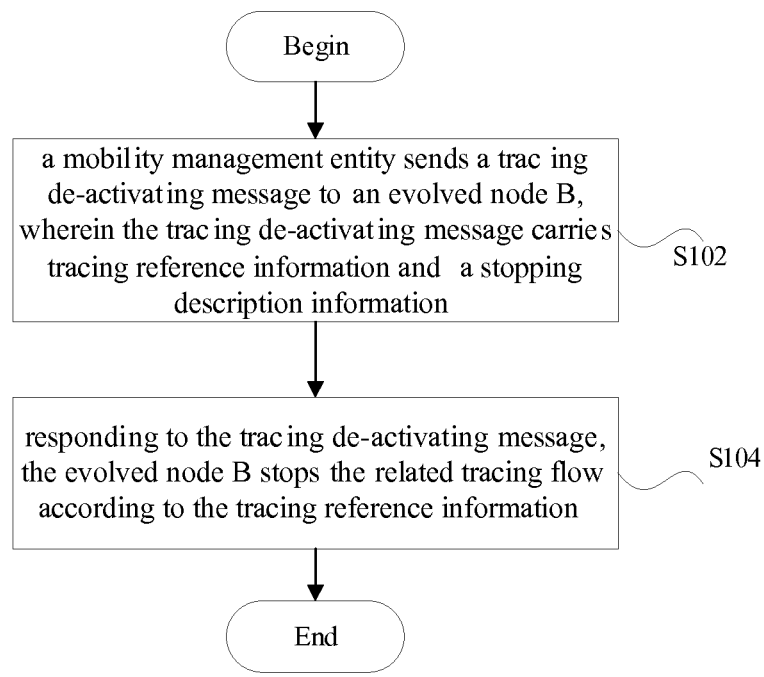
FIG. 1 is a flow chart showing the method for stopping a tracing flow according to the first embodiment of the present invention.

FIG. 1 is a flow chart showing the method for stopping a tracing flow according to one embodiment of the present invention. As shown in FIG. 1, the method mainly comprises the following processes (steps S102 to S104):

Step S102, a mobility management entity (MME) sends a tracing de-activating message to an evolved node B (eNB), wherein the tracing de-activating message carries tracing reference information and a message type is also carried in the message;

Step S104, responding to the tracing de-activating message, the eNB stops the related tracing flow according to the tracing reference information.

Wherein, in step S102, the MME sends the tracing de-activating message via the S1 interface; the tracing reference information therein may serve to indicate tracing content information to be stopped, such as a tracing symbol that needs to be de-activating. Further, the tracing reference information is unique within a predetermined range (such as PLMN (public land mobile network) range).

The tracing de-activating message may further carry stopping description information comprising UE locating information, for example, information that can uniquely locate the UE on the eNB, such as the unique symbol identifying a connection between the eNB and the UE on the S1 interface; and information that can uniquely designate the UE in the MME, such as the unique symbol identifying a connection between the MME and the UE on the S1 interface.

The tracing de-activating message also carries information for indicating the stopping time and/or the stopping manner of the tracing flow, for example, setting a time stamp or a waiting time, and the eNB performs the tracing de-activating operation according to the indication of the stopping time after receiving the de-activating message. The stopping description information is set with the stopping manner, which comprises immediate stopping manner or later stopping manner. The unique connection symbol associated with the UE on the S1 interface, the time stamp, the waiting time, the immediate stopping manner and the later stopping manner mentioned above may be used separately or in combination with each other.

An example of structure of the tracing de-activating message is provided as follows. In the following message structure, it comprises the message type and the tracing reference information, both of which are compulsory options. The following structure is only exemplary and not intended to restrict the present invention.

| Name of information element | Existing status | range |
| --- | --- | --- |
| Message type | M | |
| Tracing reference information | M | Unique in the area |
| Stopping description information | M | |

Example 1

Figure 2:
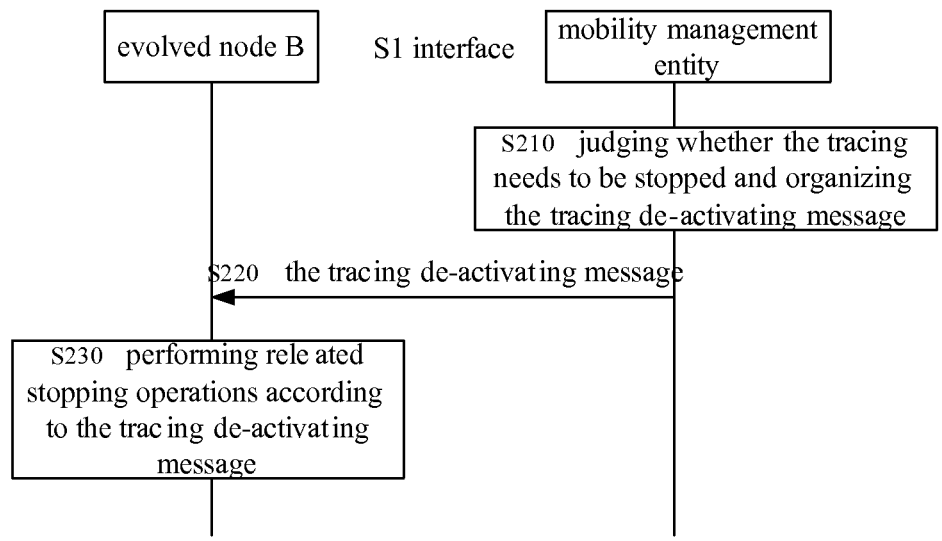
FIG. 2 is an interactive flow chart of the first embodiment according to the method shown in FIG. 1.

FIG. 2 shows the procedures of example 1 according to the first embodiment. As shown in FIG. 2, example 1 comprises the following steps:

Step S210, the CN side determines, according to the current strategy (such as indication of stopping tracing set by the CN background), to stop the tracing of users or devices, organizes the tracing de-activating message and fills, into the tracing de-activating message, the message type, the tracing reference information of the related tracing to be stopped and the stopping description information;

Step S220, the MME sends the tracing de-activating message on the S1 interface;

Step S230, the eNB receives the tracing de-activating message and stops the related tracing operations according to the tracing reference information and the stopping description information of the tracing de-activating message.

The above text describes a scenario, in which the newly added tracing de-activating message in the present invention is applied to the CN to notify the LTE base stations of stopping the indicated tracing flow. In addition, in the present invention the tracing de-activating message may also be applied to the notification of stopping tracing flow between peer LTE base stations (for example, during a hand-over procedure). The second embodiment is described as follows.

The Second Embodiment

According to another embodiment of the present invention, there is provided another method for stopping a tracing flow.

Figure 3:
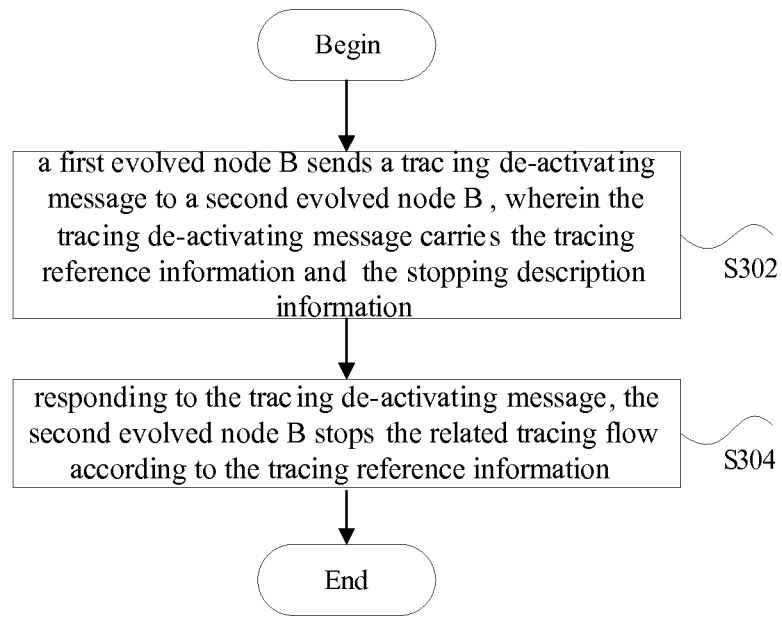
FIG. 3 is a flow chart showing the method for stopping a tracing flow according to the second embodiment of the present invention.

As shown in FIG. 3, the method for stopping a tracing flow according to the embodiment of the present invention mainly comprises the following processes (steps S302 to S304):

Step S302, a first eNB sends a tracing de-activating message to a second eNB, wherein the tracing de-activating message carries the tracing reference information and this message carries also the message type; in this step, the first eNB preferably sends the tracing de-activating message via an X2 interface. In addition, the tracing reference information of the message serves to indicate the tracing flow to be stopped and it is unique within a predetermined range.

Step S304, responding to the tracing de-activating message, the second eNB stops the related tracing flow according to the tracing reference information.

The tracing de-activating message may further carry stopping description information, which comprises the UE locating information, for example, the information may be the one that can uniquely locate the UE on the eNB, such as the unique symbol identifying a connection between the eNB and the UE on the S1 interface; or the information may be the one that can uniquely designate the UE in the MME, such as the unique symbol identifying a connection between the MME and the UE on the S1 interface.

The tracing de-activating message also carries the information for indicating the stopping time and/or the stopping manner of the tracing flow, for example, setting the time stamp or the waiting time, and the eNB performs the tracing de-activating operation according to the indication of the stopping time after receiving the tracing de-activating message. The stopping description information is set with a stopping manner, which comprises an immediate stopping manner or a later stopping manner. The unique connection symbol associated with the UE on the S1 interface, the time stamp, the waiting time, the immediate stopping manner and the later stopping manner mentioned above may be used separately or in combination with each other.

It needs to be explained that the above tracing de-activating message may be sent during a hand-over procedure, meanwhile the first eNB may be the source eNB and the second eNB may be the target eNB, or the first eNB is the target eNB and the second eNB is the source eNB.

Example 2

Figure 4:
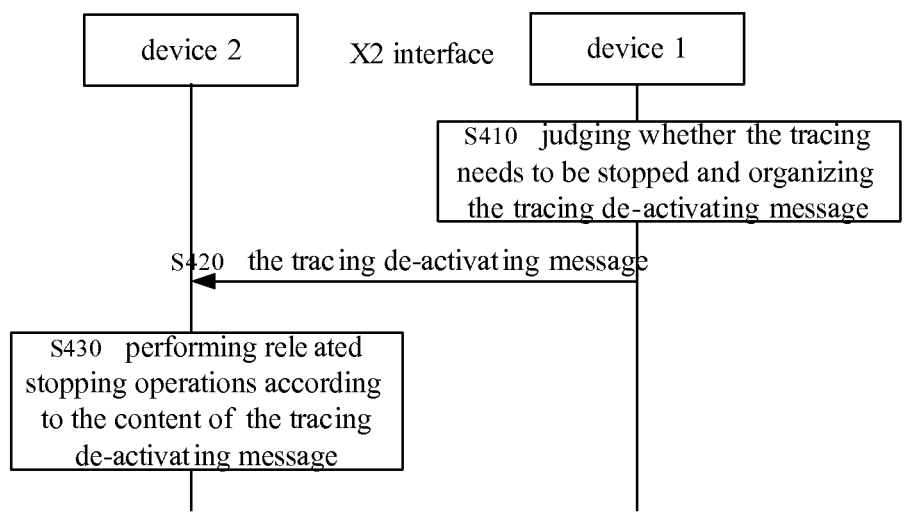
FIG. 4 is an interactive flow chart of the second embodiment according to the method shown in FIG. 3.

FIG. 4 shows the procedures according to the second embodiment. As shown in FIG. 4, example 2 mainly comprises the following steps (steps S410 to S430):

Step S410, an eNB 1 determines the tracing of users or devices to be stopped, organizes the tracing de-activating message, and fills, into the tracing de-activating message, the message type, the tracing reference information of the related tracing to be stopped and the stopping description information;

Step S420, the eNB1 sends the tracing de-activating message on the X2 interface;

Step S430, an eNB2 receives the tracing de-activating message and stops the related tracing operations according to the tracing reference information and the stopping description information of the tracing de-activating message.

As mentioned above, the relevant tracing flows may be stopped via the tracing de-activating message by means of the technical solutions provided by the present invention so as to achieve the flow management of signaling tracing stopping and make the tracing function more flexible. Meanwhile, effective means are also provided for network management, and failure locating and resolving, operation maintenance and online diagnoses etc. can be realized and widely applied in practice.

It should be understood by those skilled in the art that each module and step in the present invention may be carried out by universal computing devices either by being integrated in a single computing device or distributed in a network composed of a plurality of computing devices. Alternatively, the modules and steps may be carried out by program codes executable by a computing device, thus they may be stored in a storing device for implementation by the computing device or respectively produced into individual integrate circuit modules, or a plurality of the steps may be produced into a single integrate circuit module. Therefore, the present invention is not restricted to any specific combination of hardware and software.

The present invention has been shown with reference to the above-described preferred embodiments, and it is not to be limited by the above embodiments. It is understood by those skilled in the art various alterations and changes may be made within the spirit and scope of the invention. All modifications, substitute equivalents or improvements made therein are intended to be included in the scope of this invention.

The invention claimed is:

1. A method for stopping a tracing flow, comprising:
   a mobility management entity sending a tracing de-activating message via an S1 interface to an evolved node B, wherein the tracing de-activating message carries tracing reference information and stopping description information; and
   responsive to the tracing de-activating message, the evolved node B stopping a related tracing flow according to the tracing reference information and the stopping description information,
   wherein the stopping description information comprises UE locating information, which is a unique symbol for identifying a connection between the evolved node B and the UE on the S1 interface and/or a unique symbol for identifying a connection between the mobility management entity and the UE on the S1 interface.

2. The method according to claim 1, wherein the tracing reference information serves to indicate the tracing flow to be stopped.

3. The method according to claim 1, wherein the tracing reference information is unique within a predetermined range.

4. The method according to claim 1, wherein the stopping description information is set with a time stamp and/or a waiting time, and the evolved node B performs a tracing de-activating operation according to the indications of the time stamp and/or the waiting time after receiving the de-activating message.

5. The method according to claim 1, wherein the stopping description information is set with a stopping manner, which comprises immediate stopping manner or later stopping manner, and the evolved node B performs tracing de-activated operation according to the stopping manner after receiving the de-activated message.

6. A method for stopping a tracing flow, comprising:
   a first evolved node B sending a tracing de-activating message to a second evolved node B, wherein the tracing de-activating message is provided by a mobility management entity and carries tracing reference information and stopping description information, wherein the stopping description information includes a stopping time and/or a stopping manner of a respective tracing flow; and responsive to the tracing de-activating message, the second evolved node B stopping a related tracing flow according to the tracing reference information and the stopping description information, wherein the stopping description information comprises UE locating information, which is a unique symbol for identifying a connection between the second evolved node B and the UE on an S1 interface and/or a unique symbol for identifying a connection between the mobility management entity and the UE on the S1 interface.

7. The method according to claim 6, wherein the first evolved node B sends the tracing de-activating message via an X2 interface.

8. The method according to claim 7, wherein the tracing de-activating message is sent during a hand-over procedure, wherein the first evolved node B is the source evolved node B and the second evolved node B is the target evolved node B, or the first evolved node B is the target evolved node B and the second evolved node B is the source evolved node B.

9. The method according to claim 6, wherein the tracing reference information serves to indicate the tracing flow to be stopped and it is unique within a predetermined range.

10. The method according to claim 9, wherein the tracing de-activating message is sent during a hand-over procedure, wherein the first evolved node B is the source evolved node B and the second evolved node B is the target evolved node B, or the first evolved node B is the target evolved node B and the second evolved node B is the source evolved node B.

11. The method according to claim 6, wherein the tracing de-activating message is sent during a hand-over procedure, wherein the first evolved node B is the source evolved node B and the second evolved node B is the target evolved node B, or the first evolved node B is the target evolved node B and the second evolved node B is the source evolved node B.

12. The method according to claim 6, wherein the stopping description information is set with a time stamp and/or a waiting time, and the second evolved node B performs a tracing de-activating operation according to the indications of the time stamp and/or the waiting time after receiving the de-activating message.

13. The method according to claim 12, wherein the tracing de-activating message is sent during a hand-over procedure, wherein the first evolved node B is the source evolved node B and the second evolved node B is the target evolved node B, or the first evolved node B is the target evolved node B and the second evolved node B is the source evolved node B.

14. The method according to claim 6, wherein the stopping description information is set with a stopping manner, which comprises an immediate stopping manner or a later stopping manner, and the second evolved node B performs the tracing de-activating operation according to the instruction of the stopping manner after receiving the de-activating message.

15. The method according to claim 14, wherein the tracing de-activating message is sent during a hand-over procedure, wherein the first evolved node B is the source evolved node B and the second evolved node B is the target evolved node B, or the first evolved node B is the target evolved node B and the second evolved node B is the source evolved node B.

16. The method according to claim 6, wherein the tracing de-activating message is sent during a hand-over procedure, wherein the first evolved node B is the source evolved node B and the second evolved node B is the target evolved node B, or the first evolved node B is the target evolved node B and the second evolved node B is the source evolved node B.

* * * * *